United States Patent
Xu

(10) Patent No.: US 10,991,104 B2
(45) Date of Patent: Apr. 27, 2021

(54) IMAGE PROCESSING DEVICE, IMAGE PROCESSING METHOD, AND PROGRAM

(71) Applicant: Rakuten, Inc., Tokyo (JP)

(72) Inventor: Jiu Xu, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 120 days.

(21) Appl. No.: 16/312,245

(22) PCT Filed: Apr. 11, 2017

(86) PCT No.: PCT/JP2017/014774
§ 371 (c)(1),
(2) Date: Dec. 20, 2018

(87) PCT Pub. No.: WO2018/189802
PCT Pub. Date: Oct. 18, 2018

(65) Prior Publication Data
US 2019/0236789 A1    Aug. 1, 2019

(51) Int. Cl.
*G06T 7/194* (2017.01)
*G06K 9/62* (2006.01)
*G06T 7/60* (2017.01)

(52) U.S. Cl.
CPC ............ *G06T 7/194* (2017.01); *G06K 9/6212* (2013.01); *G06T 7/60* (2013.01); *G06T 2207/20161* (2013.01)

(58) Field of Classification Search
None
See application file for complete search history.

(56) References Cited

U.S. PATENT DOCUMENTS

| 6,563,949 | B1 | 5/2003 | Takebe |
| 2001/0019631 | A1 | 9/2001 | Ohsawa et al. |
| 2012/0259741 | A1 | 10/2012 | Iwabuchi |
| 2015/0302509 | A1 | 10/2015 | Iwabuchi |

(Continued)

FOREIGN PATENT DOCUMENTS

| JP | 2001-266158 A | 9/2001 |
| JP | 2004-030696 A | 1/2004 |
| JP | 2014-225286 A | 12/2014 |

OTHER PUBLICATIONS

Carsten Rother, Vladimir Kolmogorov, and Andrew Blake, Microsoft Research Cambridge, UK, Aug. 8, 2004 "GrabCut"—Interactive Foreground Extraction using Iterated Graph Cuts http://cvg.ethz.ch/teaching/cvl/2012/grabcut-siggraph04.pdf.

(Continued)

*Primary Examiner* — Leon Viet Q Nguyen
(74) *Attorney, Agent, or Firm* — HEA Law PLLC

(57) ABSTRACT

To increase accuracy in extracting a foreground area while saving a user time and effort. Image obtaining means of an image processing device obtains an image including a background and an object. Element area setting means sets, with respect to the image, a plurality of element areas respectively corresponding to a plurality of elements in the image. Overlapped area specifying means specifies an overlapped area in which a degree of overlap of the element areas is greater than or equal to a predetermined value in the image. Foreground area extracting means extracts a foreground area corresponding to the object from the image based on the overlapped area.

12 Claims, 10 Drawing Sheets

(56) References Cited

U.S. PATENT DOCUMENTS

2016/0259990 A1     9/2016  Yamanaka et al.
2016/0343054 A1*   11/2016  Chu .................... G06Q 30/0627
2016/0366326 A1*   12/2016  Sen ...................... H04N 5/2353
2018/0047193 A1*    2/2018  Gao ........................ G06T 7/248

OTHER PUBLICATIONS

Ming-Ming Cheng, Ziming Zhang, Wen-Yan Lin, and Philip Torr, The University of Oxford, Boston University, Brookes Vision Group, Jun. 23, 2014 BING: Binarized Normed Gradients for Objectness Estimation at 300fps, http://mmcheng.net/mftp/Papers/ObjectnessBING.pdf.

English translation of the International Search Report for PCT/JP2017/014774.

Search Report dated Nov. 3, 2020, for corresponding EP Patent Application No. 17905661.9.

* cited by examiner

IMAGE PROCESSING DEVICE, IMAGE PROCESSING METHOD, AND PROGRAM

CROSS REFERENCE TO RELATED APPLICATIONS

This application is a National Stage of International Application No. PCT/JP2017/014774 filed on Apr. 11, 2017. The contents of the above document is incorporated herein by reference in its entirety.

TECHNICAL FIELD

The present invention relates to an image processing device, an image processing method, and a program.

BACKGROUND ART

There are known techniques for extracting, from an image including a background and an object, a foreground area corresponding to the object. For example, Non-Patent Literature 1 describes a method called Grabcut for segmenting foreground and background areas in an image. For example, although not being directed to extracting a foreground area, Non-Patent Literature 2 describes automatically detecting each object in an image, and setting a bounding box to enclose each object in the image.

CITATION LIST

Non-Patent Literature

Non-Patent Literature 1: http://cvg.ethz.ch/teaching/cvl/2012/grabcut-siggraph04.pdf
Non-Patent Literature 2: http://mmcheng.net/mftp/Papers/ObjectnessBING.pdf

SUMMARY OF INVENTION

Technical Problem

However, in Non-Patent Literature 1, the user needs to manually specify the area indicative of the object so as to execute the Grabcut method. As such, for example, if there are many images from which a user wishes to extract foreground areas, the user needs to manually specify areas indicative of objects for each of the many images. This takes much time and effort.

In this regard, when the bounding box in Non-Patent Literature 2 is extracted as a foreground area in an attempt to automatically extract a foreground area, it is difficult to specify which bounding box is optimal for a foreground area because an image includes a lot of bounding boxes. Even if the bounding box to be a foreground area is somehow selected, the bounding box is a quadrangle (bounding rectangle) enclosing an element and is not cut off along the outline of the object, and thus the foreground area includes many backgrounds, which do not serve to increase accuracy in extracting the foreground area.

One or more embodiments of the present invention have been conceived in view of the above, and an object thereof is to increase accuracy in extracting a foreground area while saving a user time and effort.

Solution to Problem

In order to solve the above described problems, an image processing device according to the present invention includes image obtaining means for obtaining an image including a background and an object, element area setting means for setting, with respect to the image, a plurality of element areas respectively corresponding to a plurality of elements in the image, overlapped area specifying means for specifying an overlapped area in the image, the overlapped area being an area in which a degree of overlap of the element areas is greater than or equal to a predetermined value, and foreground area extracting means for extracting a foreground area from the image based on the overlapped area, the foreground area corresponding to the object.

An image processing method according to the present invention includes the steps of obtaining an image including a background and an object, setting, with respect to the image, a plurality of element areas respectively corresponding to a plurality of elements in the image, specifying an overlapped area in the image, the overlapped area being an area in which a degree of overlap of the element areas is greater than or equal to a predetermined value, and extracting a foreground area from the image based on the overlapped area, the foreground area corresponding to the object.

A program according to the present invention causes a computer to function as image obtaining means for obtaining an image including a background and an object, element area setting means for setting, with respect to the image, a plurality of element areas respectively corresponding to a plurality of elements in the image, overlapped area specifying means for specifying an overlapped area in the image, the overlapped area being an area in which a degree of overlap of the element areas is greater than or equal to a predetermined value, and foreground area extracting means for extracting a foreground area from the image based on the overlapped area, the foreground area corresponding to the object.

The information storage medium according to the present invention is a computer-readable information storage medium that stores the program.

In one aspect of the present invention, the foreground area extracting means executes separating processing on the image to separate the foreground and the background based on the overlapped area, thereby extracting the foreground area.

In one aspect of the present invention, based on a determination result on whether a pixel is included in an element area, the overlapped area specifying means calculates a value indicating the degree of overlap of the pixel, and specifies the overlapped area based on a determination result on whether the value is greater than or equal to a threshold value.

In one aspect of the present invention, the value indicates brightness of a corresponding pixel of a determination image having a same size as the image.

In one aspect of the present invention, the image processing device further includes threshold value setting means that sets the threshold value according to the image, and the overlapped area specifying means determines, for each pixel, whether the value is greater than or equal to the threshold value set by the threshold value setting means.

In one aspect of the present invention, the overlapped area specifying means specifies a temporary overlapped area based on a determination result on whether the value is greater than or equal to the threshold value for each pixel, the threshold value being set by the threshold value setting means, and determines, based on data indicating a basic shape of the object, whether similarity between a shape of the temporary overlapped area and the basic shape is greater than or equal to a predetermined value, the threshold value setting means continues to change the threshold value and determine the similarity until it is determined that the similarity is greater than or equal to the predetermined value, and the overlapped area specifying means specifies the temporary overlapped area that is determined to be similar to the basic shape as the overlapped area.

In one aspect of the present invention, the image is associated with attribute information indicating an attribute of the object, and the threshold value setting means sets the threshold value according to the attribute information of the image.

In one aspect of the present invention, the threshold value setting means sets the threshold value according to a histogram of the image.

In one aspect of the present invention, the overlapped area specifying means assigns a weight to each of the element areas based on respective positions of the element areas in the image so as to calculate the value.

In one aspect of the present invention, the overlapped area specifying means assigns a weight to each element area based on a size of each element area so as to calculate the value.

In one aspect of the present invention, the image is a commodity image showing a commodity to be bought and sold using an Internet, the object is the commodity shown in the commodity image, the image obtaining means obtains the commodity image uploaded via the Internet, the foreground area is an area in the commodity image and includes the commodity, and the image processing device further includes search information obtaining means that obtains search information of the commodity based on the foreground area extracted from the commodity image.

Effects of the Invention

According to the present invention, accuracy in extracting a foreground area can be increased while saving a user time and effort.

DESCRIPTION OF EMBODIMENTS

[1. Hardware Configuration of Image Processing Device]

Figure 1:
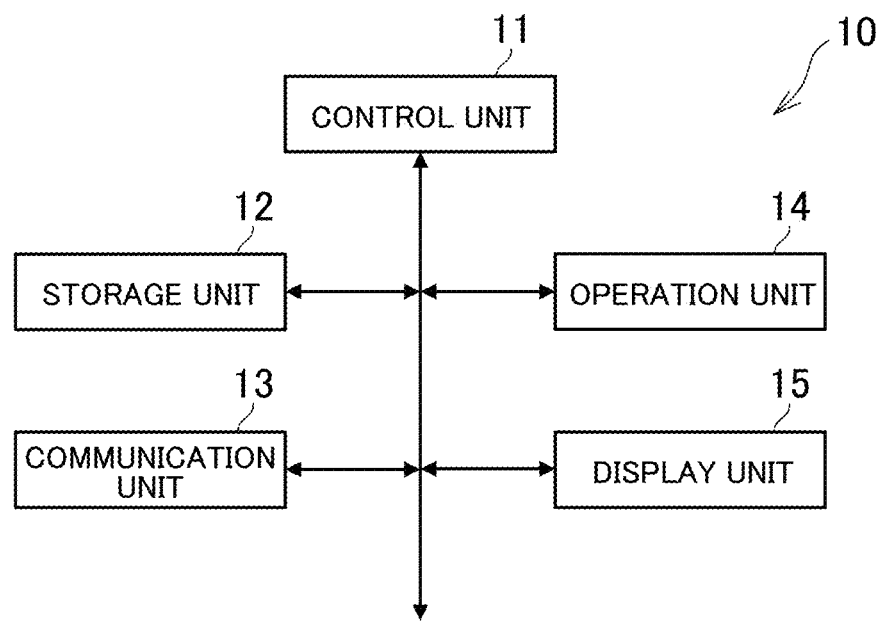
FIG. 1 is a diagram illustrating a hardware configuration of an image processing device.

An embodiment of an image processing device according to the present invention will be described below. FIG. 1 is a diagram illustrating a hardware configuration of the image processing device. The image processing device 10 is a computer capable of image processing, such as a server computer, a personal computer, and a portable terminal (including a smartphone and a tablet computer). As shown in FIG. 1, the image processing device 10 includes a control unit 11, a storage unit 12, a communication unit 13, an operation unit 14, and a display unit 15.

The control unit 11 includes at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a ROM, an EEPROM, a flash memory, and a hard disk. The communication unit 13 is a wired or wireless communication interface for data communications through a network. The operation unit 14 is an input device, including a pointing device such as a touch panel and a mouse, a keyboard, and a button. The operation unit 14 transmits an operation of a user to the control unit 11. The display unit 15 is, for example, a liquid crystal display unit and an organic EL display unit. The display unit 15 displays a screen based on instructions from the control unit 11.

The programs and data described as being stored in the storage unit 12 may be provided through a network. The hardware configuration of the image processing device 10 is not limited to the above examples, and various types of hardware can be applied. For example, the hardware may include a reader (e.g., optical disc drive and memory card slot) for a computer-readable information storage medium, and an input/output unit (e.g., USB port) for inputting/ outputting data to/from external devices. For example, programs and data stored in an information storage medium may be provided to the image processing device 10 through the reader or the input/output unit.

The image processing device 10 according to this embodiment extracts a foreground area, in which a commodity is captured, from a commodity image so as to acquire information (e.g., color and pattern) for searching commodities to be bought and sold via the Internet. As described above, the Grabcut method can serve to extract a foreground area with high accuracy, although it may be troublesome for users to manually specify the commodity in the commodity image.

In this regard, in many cases, a part of the commodity is focused on and clearly captured, or includes more complicated patterns than the background, and thus, bounding boxes tend to be heavily overlapped. In this embodiment, in view of this tendency, the image processing device 10 estimates an area in which the bounding boxes are overlapped several times to be a commodity part, and executes the Grabcut method on the area so that the foreground area can be extracted with high accuracy without the user's specification of the commodity part. This technique will be described in details below.

[2. Functions Implemented in Image Processing Device]

Figure 2:
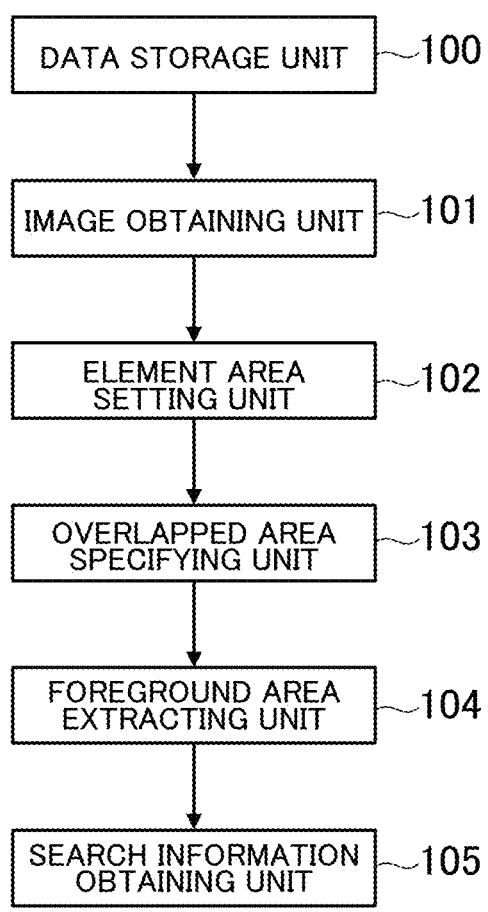
FIG. 2 is a functional block diagram showing an example of functions implemented in the image processing device.

FIG. 2 is a functional block diagram showing an example of functions implemented in the image processing device 10. As shown in FIG. 2, the image processing device 10 implements a data storage unit 100, an image obtaining unit 101, an element area setting unit 102, an overlapped area specifying unit 103, a foreground area extracting unit 104, and a search information obtaining unit 105.

[2-1. Data Storage Unit]

The data storage unit 100 is implemented mainly by the storage unit 12. The data storage unit 100 stores an image including a background and an object. The image may be a captured image in which an actual space is captured by a camera, or computer graphics (hereinafter simply referred to as CG). For example, the image may be a captured image in which a commodity is captured by a camera, or CG generated by editing the captured image with the use of graphic software (e.g., CG image of the captured image to which a character string indicating a price and a shipping charge is added) or drawn entirely by the graphic software without using the captured image.

The image may be stored in various data formats, such as BMP, JPEG, PNG, and GIF formats. Further, the number of colors of the image may be freely determined, and the image may be a color image or a gray scale image. The number of bits of a color image or a gray scale image is also freely determined, and the image may be a 24-bit RGB image or an 8-bit gray scale image, for example.

The background is, for example, an image part around an object, and a view (scene) behind the object. In a case where the image is captured by a camera, the background is, for example, a subject that is further from the camera than the object and is behind the object. In other words, the background is a subject that is partially hidden by the object. In a case where the image is CG, the background may be a 3D model or a 2D model that is further from a view point (virtual camera) than the object, or an image drawn in a layer lower than a layer of the object.

The object is, for example, an image part surrounded by a background, and a foreground in front of the background (in the view point side). In a case where the image is captured by a camera, the object is, for example, a subject that is closer to the camera than the background and in front of the background. In other words, the object is a subject that partially hides the background. In a case where the image is CG, the object may be a 3D model or a 2D model that is closer to a view point than the background, or an image drawn in a layer upper than a layer of the background.

Figure 3:
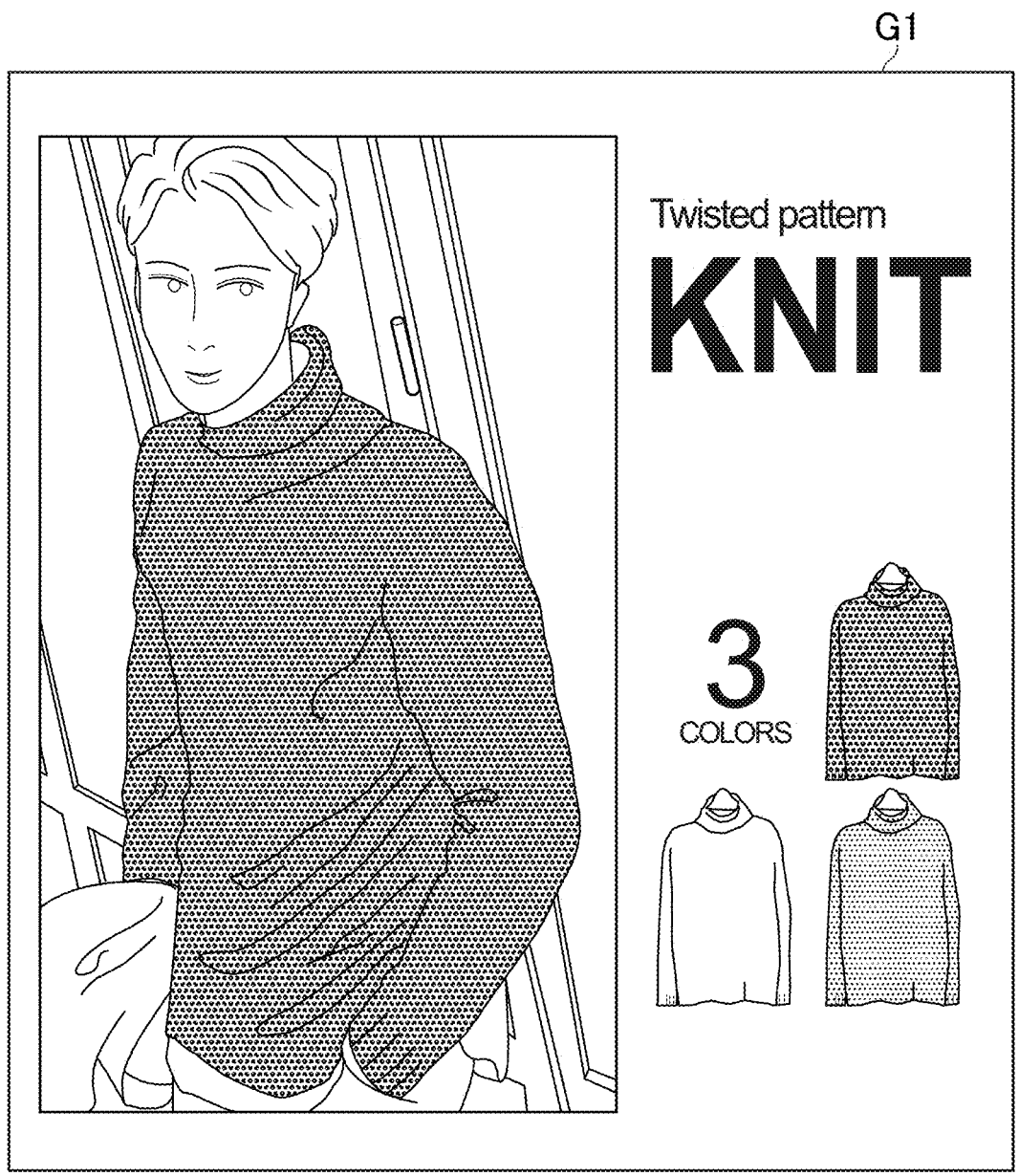
FIG. 3 is a diagram illustrating an example of the image.

FIG. 3 is a diagram illustrating an example of the image. As shown in FIG. 3, in this embodiment, an image of a commodity that is bought and sold via the Internet will be taken as an example of an image G1. For example, the commodity is bought and sold via an on-line shopping mall, a flea market application, or an Internet auction.

In this embodiment, a commodity in a commodity image will be taken as an example of the object. In the example shown in FIG. 3, the object is a clothing item as a commodity, and the background is a space (e.g., window and door) behind a model wearing the commodity. In a case where the object is placed on a flat surface such as a desk and a floor, the background is a flat surface such as a desk and a floor.

The image G1 may be constructed only by a background and an object, or include a part other than a background and an object. In the example of FIG. 3, the image G1 includes parts other than the background and the object, such as information on the commodity (e.g., the character string "KNIT" indicating a material of the commodity) and other related commodities (e.g., other commodities different in colors). As another example, the image G1 may include a variety of information, such as a price and a shipping charge of the commodity.

In this embodiment, the image G1 is prepared by a seller of the commodity. For example, a shop or an exhibitor of the commodity prepares and uploads an image G1 by taking a photograph of the commodity or creating the image using the graphic software. The data storage unit 100 stores the uploaded image G1.

The data stored in the data storage unit 100 is not limited to the above example. The data storage unit 100 may store data necessary for extracting the foreground area from the image G1. For example, the data storage unit 100 may store a determination image and a threshold value for specifying an overlapped area described later, or store search information on commodities obtained by the search information obtaining unit 105 described later.

[2-2. Image Obtaining Unit]

The image obtaining unit 101 is implemented mainly by the control unit 11. The image obtaining unit 101 obtains the image G1 including the background and the objects. In this embodiment, the image G1 is a commodity image indicating a commodity that is sold and bought via the Internet, and thus, the image obtaining unit 101 obtains the image G1 uploaded via the Internet.

In this embodiment, the data storage unit 100 stores the image G1, and thus, the image obtaining unit 101 obtains the image G1 stored in the data storage unit 100. In a case where the image processing device 10 is connected to a camera, the image obtaining unit 101 may obtain the image G1 directly from the camera. For example, in a case where the image G1 is stored in an information storage medium, such as a flash memory, or a database server, the image obtaining unit 101 may obtain the image G1 from the information storage medium or the database server.

[2-3. Element Area Setting Unit]

The element area setting unit 102 is implemented mainly by the control unit 11. The element area setting unit 102 sets, in the image G1, element areas respectively corresponding to the elements in the image G1.

The element is, for example, each constructing element included in an image, and an element constructing an object and a background. In other words, the element is a thing that can be specified based on learning data in which basic shapes of things are stored.

For example, in a case where an object is a person, a mannequin, an animal, or a virtual character, each part (e.g., eye, nose, mouth) included in a body corresponds to an element. For example, in a case where an object is a commodity, elements include apart constructing the commodity, a pattern or a character string on the commodity, and a pattern or a character string on a package or a label, for example. For example, in a case where the commodity is a clothing item, elements include a sleeve, a cuff, a seam, a wrinkle, a pattern, and a logo of clothing. For example, in a case where the commodity is an electrical product, elements include a part included in the electrical product, and a pattern and a logo on the electrical product. For example, in a case where the commodity is a food item, elements include a pattern and a character string on a package and a label of the food item, and a pattern on the surface of the food item. For example, in a case where the image G1 is CG, elements include a pattern and a character string entered by graphic software.

The element area is, for example, an area including a whole or a part of an element. In this embodiment, a case will be described in which the element area is a bounding box. As such, a case will be described in which the element area is a bounding rectangle of an element. The element area is not limited to a bounding rectangle, but may be a quadrangle including a space around an element. The shape of the element area may be any shape, such as a polygon other than a quadrangle, a circle, and an ellipse. The element area setting unit 102 may determine an element area so as to include a whole or a part of each element detected in the image G1.

The setting method of the element area may use various known methods, such as the method described in "BING: Binarized Normed Gradients for Objectness Estimation at 300 fps" (http://mmcheng.net/mftp/Papers/Objectness-BING.pdf) and the method described in "Selective Search for Object Recognition" (https://ivi.fnwi.uva.nl/isis/publications/bibtexbrowser.php?key=UijlingsIJCV2013&bib=all.bib). For example, the data storage unit 100 may previously store learning data in which basic shapes of things are stored, and the element area setting unit 102 may detect a shape similar to the basic shape of the element in the image G1, and determine the bounding rectangle of the shape as an element area. Similarity of shapes may be determined by using various known methods, such as a pattern matching method.

Figure 4:
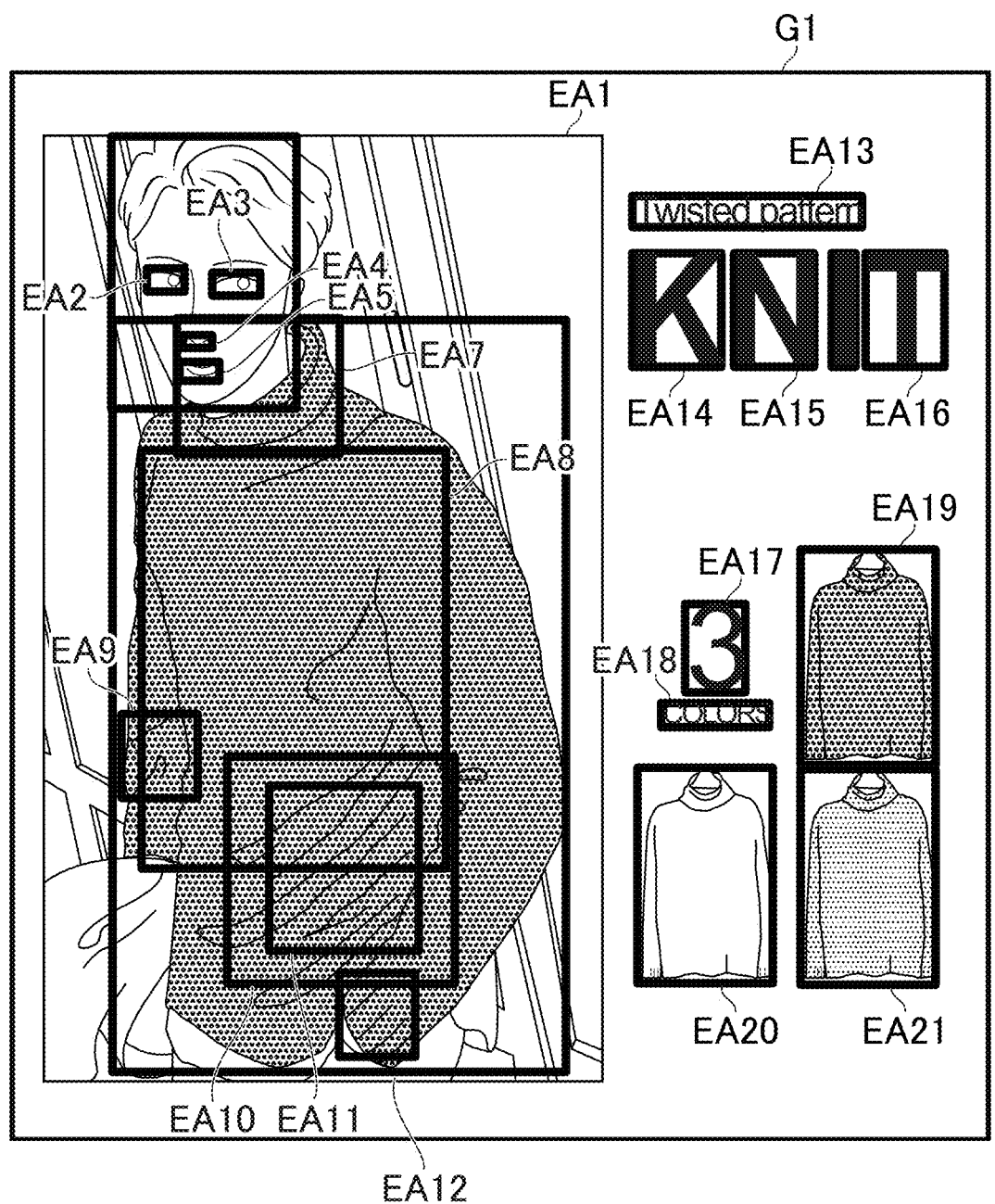
FIG. 4 is a diagram illustrating an example of element areas in the image.

FIG. 4 is a diagram illustrating an example of element areas in the image G1. As shown in FIG. 4, the element area setting unit 102 determines a bounding box of an element detected in the image G1 as an element area EA. Here, the number of the element areas EA is reduced to simplify FIG. 4. For example, FIG. 4 shows only 21 element areas of EA1 to EA21, although actually several hundreds or thousands or more of element areas EA may be set.

For example, the element area EA1 is an area in which the entire face of the model who wears the commodity is detected as an element. For example, the element areas EA2 to EA5 are areas in which the right eye, the left eye, the nose, and the mouth are respectively detected as elements. For example, the element areas EA6 to EA12 are areas in which the clothing item, which is an object, is detected as elements, such as a whole clothing item, a neck part, a body part, a right arm part, and a wrinkle part. For example, the element areas EA13 to EA21 are areas in which the description on the commodity and other commodities different in colors are detected as elements.

As shown in FIG. 4, in the image G1, the element areas EA6 to EA12 are overlapped with one another in the object part (photographed part of the clothing item as a commodity), and the element areas EA are not overlapped in other parts than the object part. For example, each of the characters in the image G1 is detected as one element, and thus the element areas EA13 to EA18 are not overlapped. For example, the other commodities different in colors in the image G1 are photographed in small sizes and not shown in detail. As such, each of the commodities different in colors is detected as one element, and thus the element areas EA19 to EA21 are not overlapped.

[2-4. Overlapped Area Specifying Unit]

The overlapped area specifying unit 103 is implemented mainly by the control unit 11. The overlapped area specifying unit 103 specifies an overlapped area where a degree of overlap of element areas EA is greater than or equal to a predetermined value in the image G1. In a case where an equal weight is given to all element areas EA so as to specify an overlapped area as in this embodiment, for example, the degree of overlap is a value indicating how many element areas EA are arranged in an overlapped way (the number of overlapped element areas EA). For example, in a case where weights are changed depending on element areas EA (e.g., variations (5) and (6) described later), the degree of overlap is a value calculated based on weights assigned to the element areas EA. The overlapped areas may be one area formed of continuous areas, or a plurality of areas apart from each other. For example, the overlapped area is an area formed of pixels where the number of overlapped element areas EA is greater than or equal to the predetermined value.

For example, each pixel in the image G1 is associated with a value indicating a degree of overlap. The value may be any value relative to a degree of overlap. In this embodiment, the greater value indicates the greater degree of overlap. In contrast, the smaller value may indicate the greater degree of overlap. For example, brightness of corresponding pixels in a determination image having the same size as the image G1 is described as a value indicating the degree of overlap. Brightness is information on color brightness, and also referred to as pixel value or luminance. The corresponding pixel is a pixel having the same position (coordinates).

Here, an example will be described in which brightness of an n-bit gray scale image is used. For example, brightness of each pixel is indicated as an integer of 0 to $2^{n-1}$. Here, 0 is black, $2^{n-1}$ is white, and values between them indicate an intermediate color (gray). In the following, in order to distinguish images, an image (FIG. 3) from which a foreground area is extracted is described as an original image G1, and an image for determination (FIG. 5) having the same size as the original image and different in brightness is described as a determination image G2.

Figure 5:
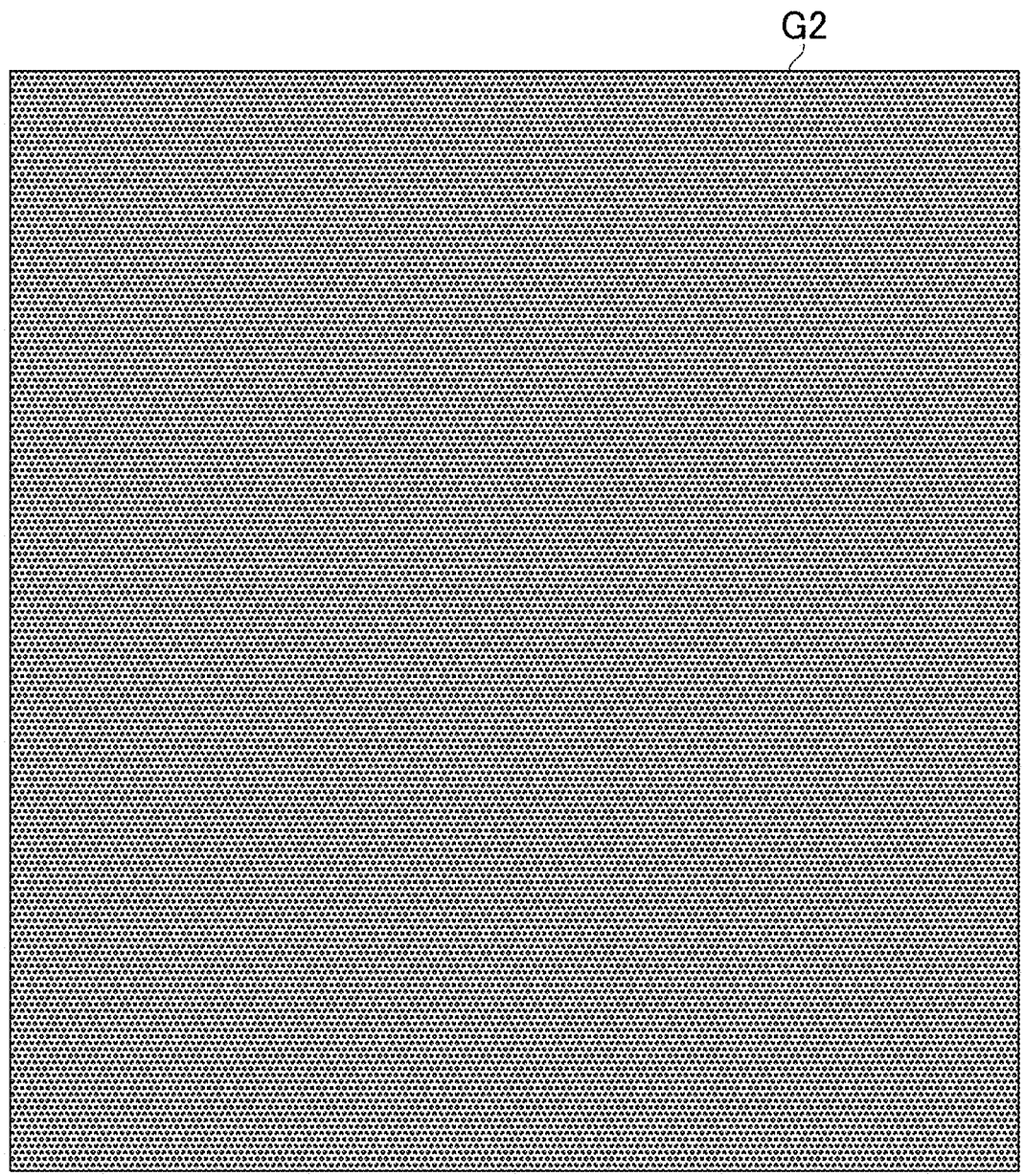
FIG. 5 is a diagram illustrating an example of a determination image.

FIG. 5 is a diagram illustrating an example of the determination image G2. As shown in FIG. 5, the determination image G2 has the same number of vertical and horizontal pixels as the original image G1. The determination image G2 is set to default brightness, and here, a case will be described in which an initial value of brightness is 0 (black). The initial value of brightness may be $2^{n-1}$ (white), or a value equal to or greater than 1 and less than $2^{n-1}$ (intermediate color).

The overlapped area specifying unit 103 changes brightness of the determination image G2 based on each element area EA. For example, the overlapped area specifying unit 103 calculates brightness of the determination image G2 based on a determination result on whether each pixel is included in the element areas EA, and specifies an overlapped area based on a determination result on whether the brightness is a threshold value or more. In other words, the overlapped area specifying unit 103 calculates brightness of the determination image G2 based on a specifying result on pixels included in each of the element areas EA.

The overlapped area specifying unit 103 may change the brightness inside the element areas EA, or change the brightness outside the element areas EA. That is, the overlapped area specifying unit 103 may change either one of the brightness inside the element areas EA and the brightness outside the element areas EA. In other words, the overlapped area specifying unit 103 may change the brightness of pixels included in the element areas EA, or change the brightness of pixels that are not included in the element areas EA. In this embodiment, a case will be described in which the overlapped area specifying unit 103 changes the brightness inside the element areas EA.

The overlapped area specifying unit 103 may increase or reduce the brightness. Whether to increase or reduce the brightness may be determined, for example, according to the initial value of the brightness of the determination image G2. The brightness may be increased if the initial value is low, and may be reduced if the initial value is high. In this embodiment, since the initial value of the brightness is 0, a case will be described in which the overlapped area specifying unit 103 increases the brightness.

Figure 6:
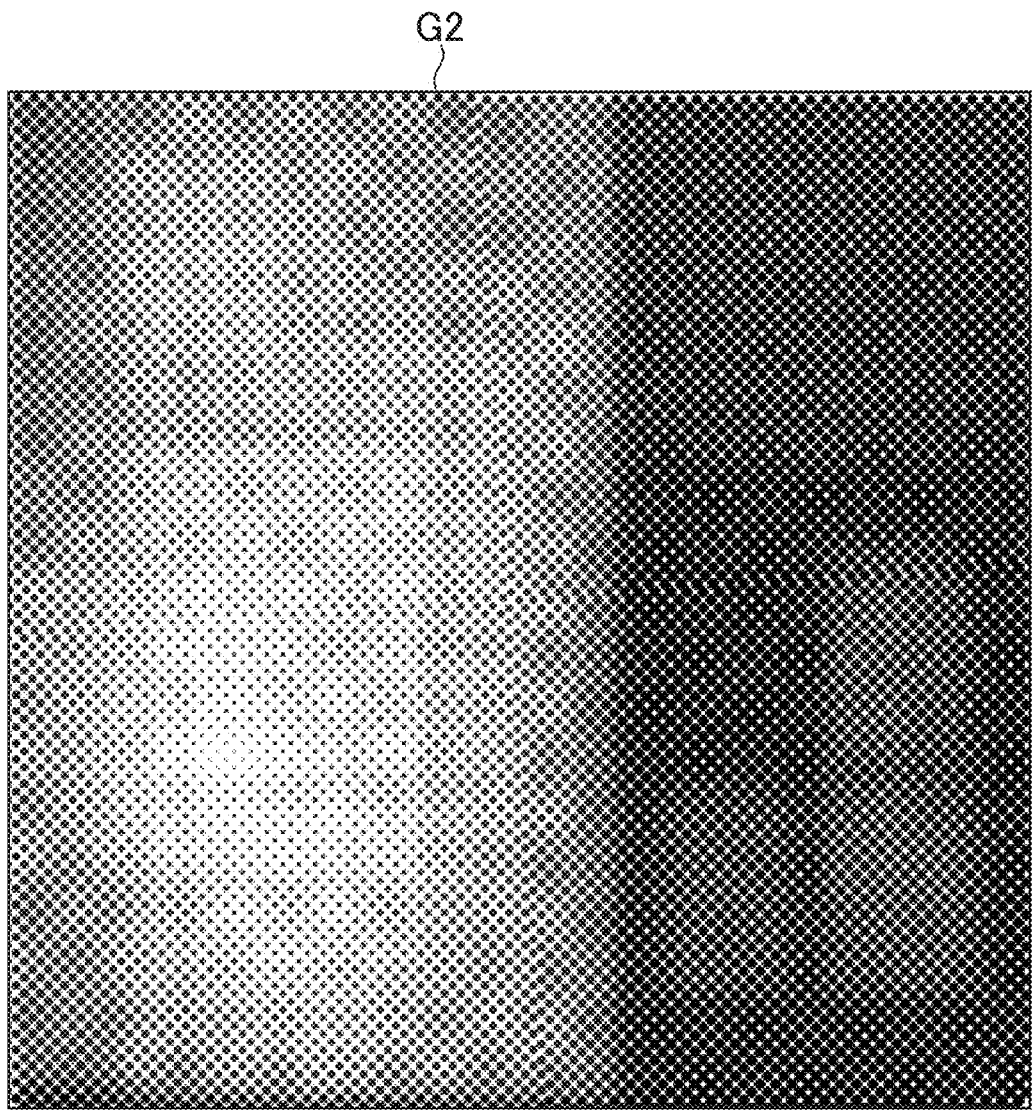
FIG. 6 is a diagram illustrating an example of the determination image in which a brightness is changed.

FIG. 6 is a diagram illustrating an example of the determination image G2 in which the brightness is changed. In FIG. 6, the brightness of pixels is represented by depth (density) of dots. When the dots are denser, the brightness is lower, and when the dots are sparser, the brightness is higher. For example, the overlapped area specifying unit 103 specifies pixels included in each of the element areas EA, and increase the brightness of the specified pixels. The amount of increase in brightness may be any amount and is set to 1 here, although may be set to 2 or more. In this embodiment, the brightness inside the element areas EA is increased, and thus, a portion where the element areas EA are overlapped several times has high brightness and appears whitish as shown in FIG. 6. On the other hand, a portion where the element areas EA are not overlapped has low brightness and appears blackish.

For example, the overlapped area specifying unit 103 specifies an overlapped area based on a determination result on whether brightness of each pixel is a threshold value or more. The threshold value is stored in the data storage unit 100 in advance and described as a fixed value in this embodiment, although the threshold value may be changed in response to an input by a user, or set to a value according to the original image G1 as described later in a variation.

In this embodiment, the higher brightness indicates the greater degree of overlap of the element areas EA, and thus, the overlapped area specifying unit 103 specifies an area in which brightness of each pixel in the determination image G2 is the threshold value or more as an overlapped area. For example, the overlapped area specifying unit 103 binarizes the determination image G2 so as to specify an overlapped area based on results of comparing brightness of each pixel with the threshold value.

Figure 7:
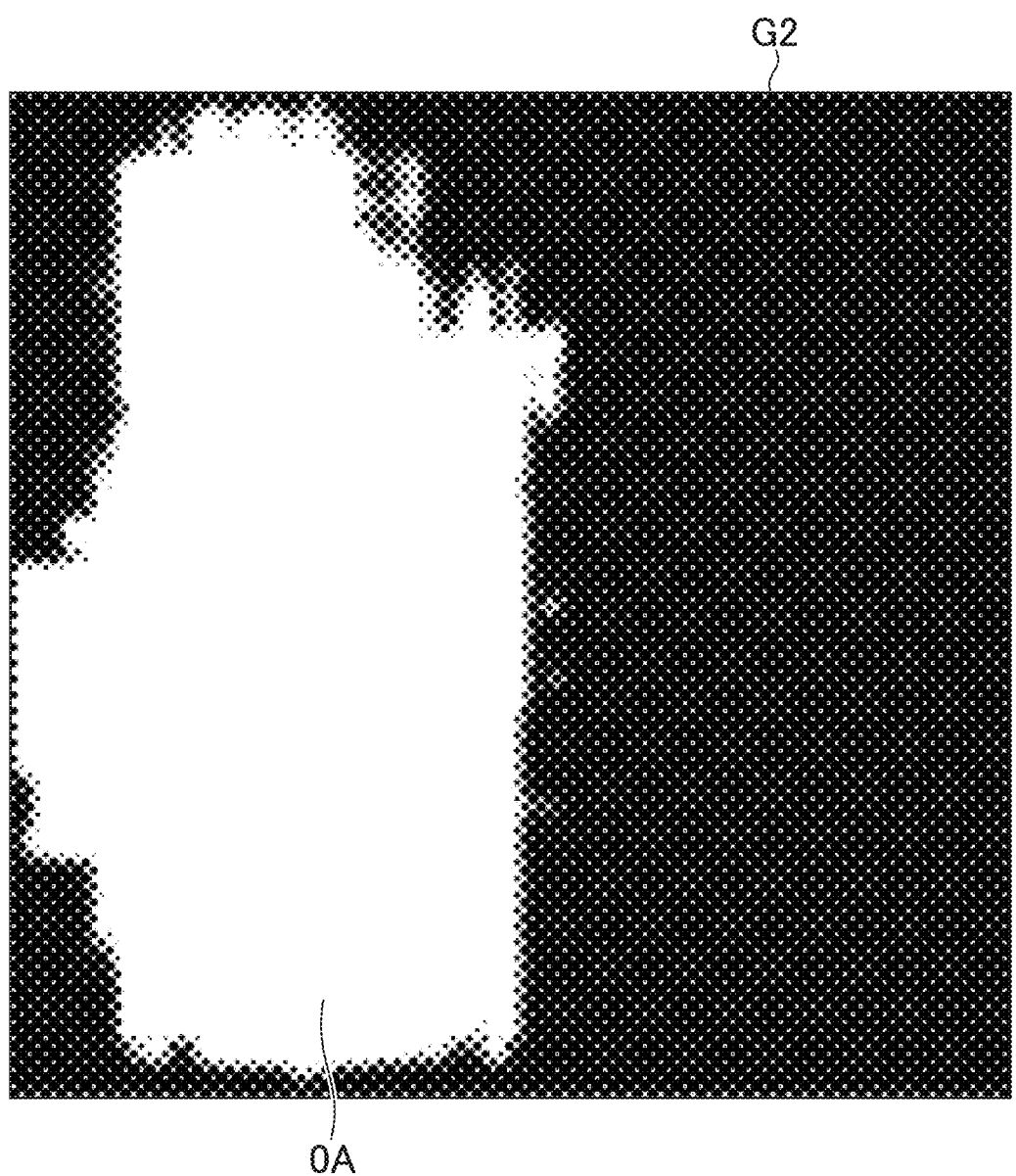
FIG. 7 is a diagram illustrating an example of a binarized determination image.

FIG. 7 is a diagram illustrating an example of the binarized determination image G2. As shown in FIG. 7, the overlapped area specifying unit 103 sets a pixel having brightness of the threshold value or more to a white pixel, and sets a pixel having brightness less than the threshold value to a black pixel. The binarized determination image G2 may remain in a gray scale format, but may be converted into a monochrome format, because there is no intermediate color. For example, the overlapped area specifying unit 103 specifies an area in the determination image G2 in which white pixels are continuous as an overlapped area OA.

[2-5. Foreground Area Extracting Unit]

The foreground area extracting unit 104 is implemented mainly by the control unit 11. The foreground area extracting unit 104 extracts, from the original image G1, a foreground area corresponding to the object based on the overlapped area OA. The foreground area includes a whole or a part of the object, and an overlapped area OA may be simply set as a foreground area, although in this embodiment, the foreground area extracting unit 104 executes separating processing on the original image G1 for separating a foreground and a background based on the overlapped area OA, thereby extracting the foreground area.

Figure 8:
FIG. 8 is a diagram illustrating an example of a foreground area.

FIG. 8 is a diagram illustrating an example of the foreground area. As shown in FIG. 8, the original image G1 is a commodity image in this embodiment. As such, a foreground area FA is an area of the commodity image where a commodity is captured. For example, the foreground area extracting unit 104 specifies the overlapped area OA as an object part and executes the Grabcut, thereby extracting the foreground area FA. The Grabcut method is a method of extracting the foreground area FA by repeating graph cuts.

In this embodiment, the Grabcut method is described as an example of the separating processing, although the separating processing may be any processing of separating the background and the foreground, and various known methods can be applied. For example, as the separating processing, the ScribbleSup method (https://arxiv.org/abs/1604.05144) may be used, or the Lazy Snapping method (http://home.c-se.ust.hk/~cktang/sample_pub/lazy_snapping.pdf) may be used. For example, a background subtraction method or a Graphcut method may be used as the separating processing.

[2-6. Search Information Obtaining Unit]

The search information obtaining unit 105 is implemented mainly by the control unit 11. The search information obtaining unit 105 obtains search information on the commodity based on the foreground area FA extracted from the original image G1. The search information is information usable for searching commodities, and indicates characteristics or attributes of the commodities. For example, the search information includes color, pattern, shape, type (genre or category), and size of the commodities.

The search information obtaining unit 105 obtains search information on the commodity by performing image analysis on the foreground area FA. For example, in a case where a color is used for search information, the search information obtaining unit 105 may generate a histogram of the foreground area FA and define frequency of each shade as search information, or obtain a color having the highest frequency or frequency greater than or equal to a threshold value as search information. As another example, the search information obtaining unit 105 may obtain the average value of colors in the foreground area FA as search information, or obtain a color at a predetermined position of the foreground area FA (e.g., pixels at the center or around the center) as search information.

For example, if a pattern is used for search information, the data storage unit 100 may store various patterns in advance, and the search information obtaining unit 105 performs pattern matching on the foreground area FA to obtain a similar pattern as search information. For example, if a shape is used for search information, the data storage unit 100 may store various shapes in advance, and the search information obtaining unit 105 performs pattern matching on the foreground area FA to obtain a similar shape as search information.

For example, if a type (genre or category) of the commodity is used for search information, the data storage unit 100 may store shapes of respective types of commodities in advance, and the search information obtaining unit 105 performs pattern matching on the foreground area FA to obtain a type of the commodity corresponding to a similar shape as search information. For example, if a size is used for search information, the data storage unit 100 may store shapes for respective sizes in advance, and the search information obtaining unit 105 performs pattern matching on the foreground area FA to obtain a size corresponding to a similar shape as search information.

[3. Processing Executed in this Embodiment]

Figure 9:
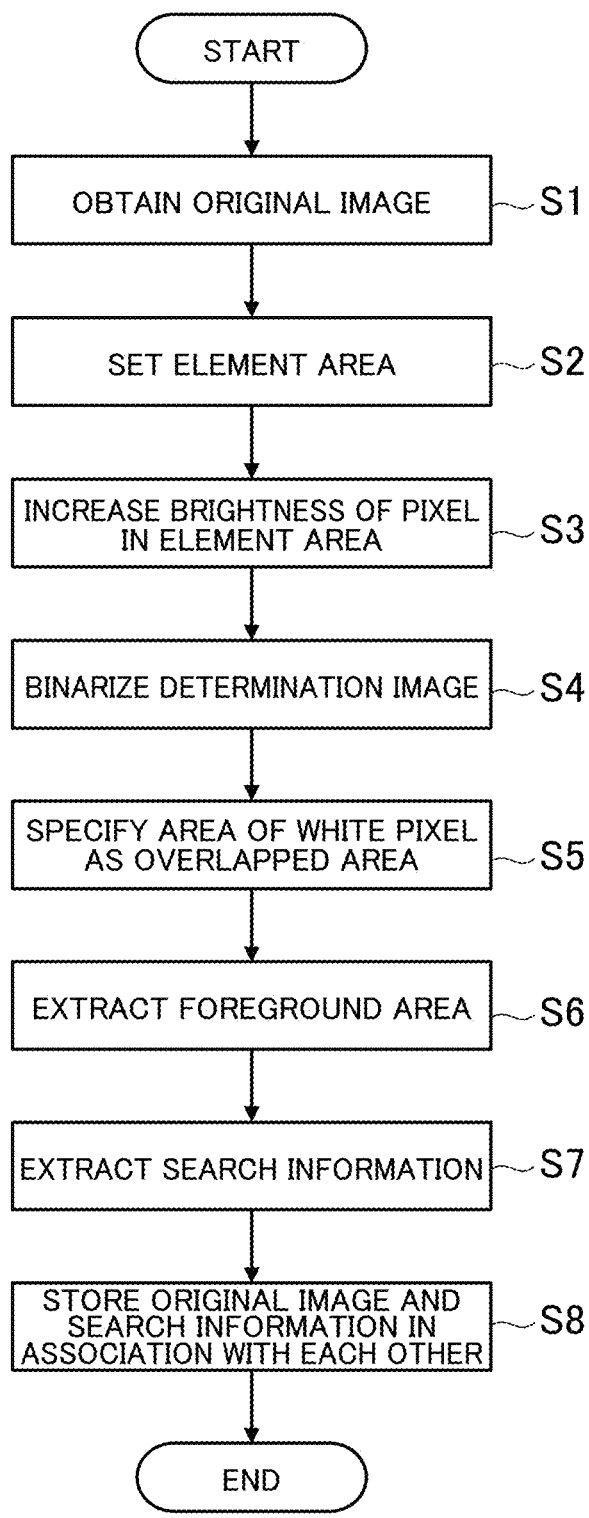
FIG. 9 is a flow chart showing an example of processing executed in the image processing device.

FIG. 9 is a flow chart showing an example of processing executed in the image processing device 10. The processing shown in FIG. 9 is executed when the control unit 11 operates in accordance with the program stored in the storage unit 12. The processing described below is an example of the processing executed by the functional block shown in FIG. 2.

As shown in FIG. 9, the control unit 11 obtains an original image G1 stored in the storage unit 12 (S1). The original image G1 to be a target of the processing may be specified by a user. Alternatively, among original images G1 stored in the storage unit 12, some or all of the original images G1 from which a foreground area FA is not extracted may be a target of the processing. The control unit 11 detects elements in the original image G1, and sets element areas EA respectively corresponding to the elements (S2). In S2, the control unit 11 sets bounding boxes enclosing the elements detected in the original image G1 as the element areas EA.

The control unit 11 prepares a determination image G2 in the same size as the original image G1, and increases brightness of pixels in each of the element areas EA (S3). In S3, the control unit 11 increases brightness of pixels in each of the element areas EA. The control unit 11 executes the same processing to all of the element areas EA detected in S2 so as to increase brightness of the determination image G2. The control unit 11 binarizes the determination image G2 having the brightness increased in S3 (S4). In S4, the control unit 11 sets a pixel having brightness of the threshold value or more to a white pixel, and sets a pixel having brightness less than the threshold value to a black pixel.

The control unit 11 specifies an area of white pixels in the determination image G2 binarized in S4 as an overlapped area OA (S5). The control unit 11 executes the Grabcut segmentation on the original image G1 based on the overlapped area OA specified in S5, thereby extracting the foreground area FA from the original image G1 (S6). In S6, the control unit 11 executes the Grabcut segmentation assuming that the overlapped area OA is specified as an object part.

The control unit 11 extracts search information from the foreground area FA extracted in S6 (S7). In S7, the control unit 11 performs image analysis on the foreground area FA, thereby extracting search information. The control unit 11 stores the original image G1 and the search information extracted in S7 in association with each other in the storage unit 12 (S8), and the processing terminates.

According to the image processing device 10 described above, the foreground area FA is extracted from the original image G1 based on the overlapped area OA where the degree of overlap of element areas EA is high, and thus the foreground area FA can be automatically extracted. This can save the user time and effort. Further, the foreground area FA having an outline close to that of the object can be extracted, which can serve to increase accuracy in extracting the foreground area FA.

The image processing device 10 performs separating processing, such as the Grabcut, on the overlapped area OA without the need of the user's specification of the object part, thereby saving the user's trouble when extracting the foreground area FA with high accuracy.

The image processing device 10 specifies the overlapped area OA with use of the value indicating the degree of overlap of the element areas EA, thereby simplifying the processing of specifying the overlapped area OA. This can serve to reduce the processing load on the image processing device 10 and promptly extract the foreground area FA.

The image processing device 10 specifies the overlapped area OA with use of the brightness of the determination image G2 having the same size as the image G1, thereby simplifying the processing of specifying the overlapped area OA. This can serve to reduce the processing load on the image processing device 10 and promptly extract the foreground area FA.

In a case where search information on a commodity is manually entered, there is a possibility that wrong or inadequate search information is associated with the commodity. In this regard, the image processing device 10 analyzes the foreground area FA of the original image G1 so as to obtain the search information, which serves to increase the accuracy of the search information and achieve highly reliable commodity search.

[4. Variations]

The present invention is not to be limited to the above described embodiment and can be changed as appropriate without departing from the spirit of the invention.

(1) For example, in the embodiment, the threshold value to compare with brightness of each of pixels in the determination image G2 is described as a fixed value, although the threshold value may be a variable value. That is, the threshold value of brightness as a reference when binarizing the determination image G2 may be a variable value instead of a fixed value.

Figure 10:
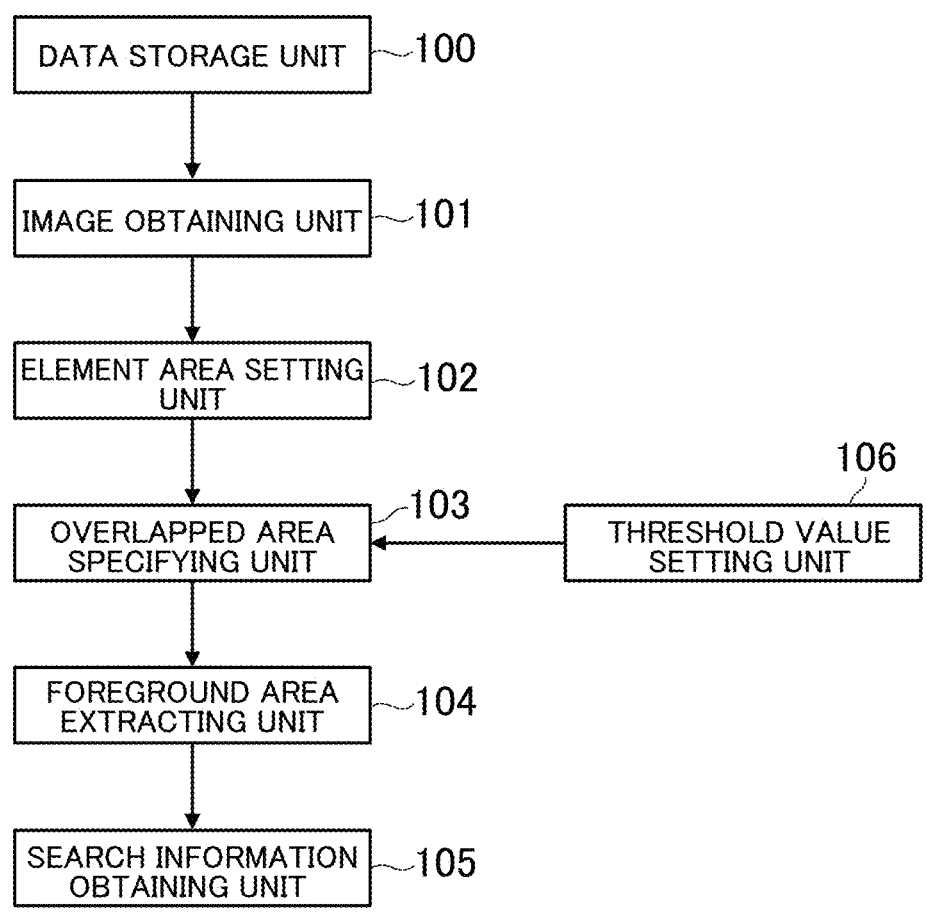
FIG. 10 is a functional block diagram of variation (1).

FIG. 10 is a functional block diagram of variation (1). As shown in FIG. 10, in this variation, a threshold value setting unit 106 is implemented in addition to the functions described in the embodiment. The threshold value setting unit 106 is implemented mainly by the control unit 11. The threshold value setting unit 106 sets a threshold value according to the original image G1. The threshold value according to the original image G1 is a threshold value according to features of the original image G1. The features of the original image G1 are, for example, color and shape features. To set a threshold value is to change a threshold value to a value according to the original image G1.

The data indicating relationship between the features of the original image G1 and the threshold value is stored in the data storage unit 100 in advance. This information may be provided in a numerical formula or a table format, or described in a portion of a program code. The threshold value setting unit 106 sets a threshold value associated with the features of the original image G1.

For example, the features of the original image G1 may be indicated in additional information associated with the original image G1. The additional information may include a size of the original image G1, for example, other than the attribute information in variation (3). For example, when the size of the original image G1 is larger, the more number of subjects are likely captured in the original image G1, and thus the more number of element areas EA are likely detected. As such, unless conditions of detection in the overlapped area OA are strictly defined, the overlapped area OA may include many backgrounds, and thus the accuracy in the foreground area FA may be reduced. In this regard, the threshold value setting unit 106 may set the threshold value such that conditions of detection in the overlapped area OA are more strictly defined when the size of the original image G1 is larger.

In a case where the pixel having high brightness is set as the overlapped area OA as in the embodiment, increasing the threshold value corresponds to strictly defining condition of detection in the overlapped area OA. In a case where the pixel having low brightness is set as the overlapped area OA as in variation (7) described later, reducing the threshold value corresponds to strictly defining condition of detection in the overlapped area OA. The same is applied to the following description.

For example, the additional information indicating the feature of the original image G1 may be a resolution of the original image G1. For example, when the original image G1 has a higher resolution, a subject may appear more clearly and more number of element areas EA may be detected. As such, unless conditions of detection in the overlapped area OA are strictly defined, the overlapped area OA may include many backgrounds, and thus the accuracy of the foreground area FA may be reduced. The threshold value setting unit 106 may set the threshold value such that conditions of detection in the overlapped area OA are more strictly defined when a resolution of the original image G1 is higher.

For example, the feature of the original image G1 may be obtained not only by the additional information but by analyzing the original image G1. The analyzing method may use the number of the element areas EA, for example, in addition to analyzing the histogram as described in variation (4). For example, when the number of the element areas EA detected in the original image G1 is greater, there is a higher possibility that not only the object but also the backgrounds are focused. As such, unless conditions of detection in the overlapped area OA are strictly defined, the overlapped area OA may include many backgrounds, and thus the accuracy of the foreground area FA may be reduced. Thus, the threshold value setting unit 106 may set the threshold value such that conditions of detection in the overlapped area OA are more strictly defined when the number of the element areas EA is greater.

For example, in a case where the element areas EA are scattered not only around the center but also around the edge of the original image G1, not only the object around the center but also the background around the edge may be focused. As such, unless conditions of detection in the overlapped area OA are strictly defined, the overlapped area OA may include many backgrounds, and thus the accuracy of the foreground area FA may be reduced. Thus, the threshold value setting unit 106 may set the threshold value such that conditions of detection of the overlapped area OA are more strictly defined when the element area EA is located around the edge of the image.

The relationship between the features of the original image G1 and the threshold value is not limited to the above described examples. The threshold value setting unit 106 may determine a threshold value according to the features of the original image G1. As another example, a threshold value according to a data format and a data amount of the original image G1 may be determined, or a threshold value according to the sizes of the element areas detected in the EA original image G1 may be determined.

The overlapped area specifying unit 103 determines whether brightness of each pixel is greater than or equal to the threshold value set by the threshold value setting unit 106. That is, in a case where the threshold value setting unit 106 changes the threshold value, the overlapped area specifying unit 103 executes the determination processing based on the changed threshold value. Details of the determination processing of the overlapped area specifying unit 103 are as described in the embodiment.

According to the variation (1), the overlapped area OA is extracted based on the threshold value according to the original image G1, and thus the accuracy of the foreground area FA can be increased.

(2) For example, when the threshold value setting unit 106 changes the threshold value, the condition of detection of the overlapped area OA is thereby changed, and the outline of the overlapped area OA is changed accordingly. For example, in a case where the threshold value is changed so that the condition of detection of the overlapped area OA is strictly defined, the overlapped area OA is reduced in size, and the outline of the overlapped area OA may be similar to the outline of the object. On the other hand, in a case where the threshold value is changed so that the condition of detection of the overlapped area OA is loosely defined, the overlapped area OA is increased in size, and the outline of the overlapped area OA may not be similar to the outline of the object. As such, the threshold value setting unit 106 may repeatedly change the threshold value until the shape of the object is recognized by the outline of the overlapped area OA.

The overlapped area specifying unit 103 specifies a temporary overlapped area OA based on the determination result on whether brightness of each pixel of the determination image G2 is greater than or equal to the threshold value set by the threshold value setting unit 106. The method of specifying the temporary overlapped area OA is the same as the method of specifying the overlapped area OA described in the embodiment. In this regard, in variation (2), the overlapped area specifying unit 103 does not specify the temporary overlapped area OA as an overlapped area OA until the shape of the object is recognized.

The overlapped area specifying unit 103 determines whether similarity between the shape of the temporary overlapped area OA and the basic shape is greater than or equal to the predetermined value based on learning data indicating the basic shape of the object. The learning data is data in which basic shapes of outlines of objects are stored, and stored in the data storage unit 100 in advance. For example, the overlapped area specifying unit 103 acquires similarity between the shape of the temporary overlapped area OA and the basic shape of the object based on the learning data, and determines whether the similarity is greater than or equal to the predetermined value. The method of acquiring the similarity may use a known pattern matching method. The similarity is a value indicating a degree of similarity between shapes (a degree of matching between shapes), and the higher similarity indicates a more similar shape. In this variation, when the similarity is greater than or equal to the predetermined value, the shape of the temporary overlapped area OA is similar to the basic shape of the object.

The threshold value setting unit 106 repeatedly changes the threshold value until it is determined that the similarity is greater than or equal to the predetermined value, then determines the similarity. The threshold value setting unit 106 may increase or reduce the threshold value. For example, if the threshold value is too low, the temporary overlapped area OA becomes too large and is not similar to the basic shape of the object, and thus the threshold value may be increased. Further, for example, if the threshold value is too high, the temporary overlapped area OA becomes too small and is also not similar to the basic shape of the object, and thus the threshold value may be reduced. In other words, the threshold value setting unit 106 continues to change the threshold value until the shape of the temporary overlapped area OA becomes plausible.

The amount of change in the threshold value may be a fixed value, or determined in a random manner. Alternatively, the amount of change in the threshold value may be determined based on the similarity between the shape of the temporary overlapped area OA and the basic shape. For example, the threshold value setting unit 106 may increase the amount of change in the threshold value if the current similarity is low, and may reduce the amount of change in the threshold value if the current similarity is relatively high.

The overlapped area specifying unit 103 again determines similarity between the temporary overlapped area OA and the basic shape of the object based on the threshold value changed by the threshold value setting unit 106. The overlapped area specifying unit 103 specifies the temporary overlapped area OA that is determined to be similar to the basic shape as an overlapped area OA. That is, until the shape of the temporary overlapped area OA is determined to be similar to the basic shape, the threshold value setting unit 106 continues to change the threshold value, and the overlapped area specifying unit 103 continues to specify a temporary overlapped area OA and determine similarity between the temporary overlapped area OA and the basic shape. When it is determined that the temporary overlapped area OA is similar to the basic shape, the overlapped area OA is finally determined.

According to variation (2), the foreground area FA is extracted based on the overlapped area OA similar to the object in shape, and a percentage of the object in the overlapped area OA is thereby increased (a percentage of the background in the overlapped area OA is lowered). This can increase the accuracy of the foreground area FA.

(3) For example, if the original image G1 is associated with attribute information indicating attributes of the object, the threshold value setting unit 106 may set a threshold value according to the attribute information of the original image G1. The attribute information indicates what the object is about. In other words, the attribute information is classification of objects, such as a type of an object (e.g., genre category of a commodity).

The data storage unit 100 of variation (3) stores the original image G1 in association with the attribute information. Here, a case will be described in which an object is a commodity, and thus the attribute information is specified by a seller of the commodity, and uploaded together with the original image G1. The attribute information may be specified by a user other than the seller, such as administrator of an online shopping mall. The information indicating the relationship between the attribute information and the threshold value may be stored in the data storage unit 100. This information may be provided in a numerical formula or a table format, or described in a portion of a program code. The threshold value setting unit 106 sets a threshold value associated with the attribute information of the original image G1.

For example, in a case of a big object such as a car and apiece of furniture, the object is often captured from a distance so as to be entirely included in the image, and thus the original image G1 may include many backgrounds captured therein. As such, unless conditions of detection in the overlapped area OA are strictly defined, the overlapped area OA may include many backgrounds, and thus the accuracy of the foreground area FA may be reduced. The threshold value setting unit 106 may set the threshold value such that conditions of detection of the overlapped area OA are more strictly defined when the attribute information of the object indicates a predetermined value (a value classified in big objects).

For example, if an object has less features in appearance, as with a commodity in a solid color without any patterns, and thus elements are hard to be detected, the element areas EA detected in the original image G1 are sometimes fewer in number. In this case, if conditions of detection of the overlapped area OA are strictly defined, there is a possibility that no overlapped area OA is detected. As such, the threshold value setting unit 106 may set the threshold value such that conditions of detection of the overlapped area OA are more loosely defined when the attribute information of the object indicates a predetermined value (a value classified in objects with less features in appearance).

According to variation (3), the overlapped area OA is extracted based on the threshold value according to the attributes of the object, and thus a percentage of the object in the overlapped area OA can be increased and the overlapped area OA can be readily detected. This can increase the accuracy of the foreground area FA.

(4) For example, the threshold value setting unit 106 may set a threshold value according to a histogram of the original image G1. The histogram is information indicating frequency (the number of pixels) of each shade of the original image G1. The shade is also referred to as brightness, pixel value, or luminance described above. The threshold value setting unit 106 sets a threshold value according to the features of the histogram of the original image G1. The features of the histogram indicate features of frequencies of respective shades, such as whether frequencies of shades are evenly distributed (whether many colors exist) and whether frequencies are concentrated on specific shades.

The information indicating the relationship between the histogram and the threshold value may be stored in the data storage unit 100. This information may be provided in a numerical formula or a table format, or described in a portion of a program code. The threshold value setting unit 106 sets a threshold value associated with the features of the histogram of the original image G1.

For example, in a case where the histogram of the original image G1 represents evenly distributed frequencies of shades, the original image G1 shows wide variation in color, and thus includes many colors. In such an original image G1, elements are readily detected. As such, unless conditions of detection of the overlapped area OA are strictly defined, the overlapped area OA may include many backgrounds, and the accuracy of the foreground area FA may be reduced. Thus, for example, the threshold value setting unit 106 may set the threshold value such that conditions of detection in the overlapped area OA are more strictly defined when variation in colors indicated by the histogram is larger.

For example, in a case where the histogram of the original image G1 represents frequencies concentrated on specific shades, the original image G1 shows less variation in color, and thus includes only specific colors. In such an original image G1, elements are hard to be detected. As such, if conditions of detection of the overlapped area OA are strictly defined, there is a possibility that no overlapped area OA is detected. Thus, the threshold value setting unit 106 may set the threshold value such that conditions of detection of the overlapped area OA are more loosely defined when variation in colors indicated by the histogram is smaller, for example.

According to the variation (4), the overlapped area OA is extracted based on the threshold value according to the histogram of the original image G1, and thus a percentage of the object in the overlapped area OA can be increased and the overlapped area OA can be readily detected. This can increase the accuracy of the foreground area FA.

(5) For example, the overlapped area OA may be specified also in view of positions of the respective element areas EA in the original image G1. For example, an object is positioned at the center of the original image G1 in many cases, and thus the element area EA around the center may be weighted highly.

In this variation, the overlapped area specifying unit 103 assigns weights to the element areas EA based on the positions of the respective element areas EA in the original image G1, and calculates brightness. The data storage unit 100 may store information indicating relationship between the positions and the weights of the element areas EA. This information may be provided in a numerical formula or a table format, or described in a portion of a program code. The overlapped area specifying unit 103 calculates brightness of the determination image G2 based on the weights associated with the positions of the element areas EA.

For example, when the object is assumed to be around the center of the original image G1, the overlapped area specifying unit 103 assigns more weight to an element area EA when the element area EA is closer to the center of the original image G1, and assigns less weight to an element area EA when the element area EA is closer to the edge of the original image G1.

For example, sometimes a description on a commodity is placed around the center of the original image G1, and commodities in different colors are placed on both sides of the original image G1. That is, there is a possibility that the object is placed around the edge of the original image G1, and in this case, the overlapped area specifying unit 103 may assign less weight to an element area EA when the element area EA is closer to the center of the original image G1, and assign more weight to an element area EA when the element area EA is closer to the edge of the original image G1.

The position at which the weight on the element area EA is increased is not limited to the center and the edge of the original image G1. The weight may be increased at any predetermined position. For example, the weight on the right half of the original image G1 may be increased if an object is often positioned in the right half side, and the weight on the left half of the original image G1 may be increased if an object is often positioned in the left half side. Which position on the original image G1 is to be more weighed may be determined in view of a popular layout of a commodity image, a type (genre, category) of the commodity, or type of the original image G1 (e.g., commodity image or scenic image).

According to variation (5), the overlapped area OA is extracted also in view of the positions of the element areas EA in the original image G1, and thus a percentage of the object in the overlapped area OA can be increased and the overlapped area OA can be readily detected. This can increase the accuracy of the foreground area FA.

(6) For example, the overlapped area OA may be specified also in view of sizes of the element areas EA. For example, an object usually appears in a large size in the original image G1, and thus the element area EA having a large size may be weighted highly.

In this variation, the overlapped area specifying unit 103 assigns weights to the element areas EA based on the sizes of the respective element areas EA, and calculates brightness. The data storage unit 100 may store information indicating relationship between the sizes and the weights of the element areas EA. This information may be provided in a numerical formula or a table format, or described in a portion of a program code. The overlapped area specifying unit 103 calculates brightness of the determination image G2 based on the weights associated with the sizes of the element areas EA.

For example, in a case where an object usually appears in a large size as in a commodity image, the overlapped area specifying unit 103 assigns more weight to an element area EA when the element area EA is larger, and assigns less weight to an element area EA when the element area EA is smaller.

For example, in a case where the original image G1 is a picture captured in a scene with a mountain in the background, sometimes a person as an object appears in a small size. In this case, the overlapped area specifying unit 103 may assign more weight to an element area EA when the element area EA is smaller, and assign less weight to an element area EA when the element area EA is larger.

According to variation (6), the overlapped area OA is extracted also in view of the sizes of the element areas EA, and thus a percentage of the object in the overlapped area OA can be increased and the overlapped area OA can be readily detected. This can increase the accuracy of the foreground area FA.

(7) For example, two or more of the above described variations may be combined.

For example, the case has been described in which the overlapped area specifying unit 103 increases brightness in an element area EA, although the processing performed by the overlapped area specifying unit 103 is not limited to this example. The overlapped area specifying unit 103 may specify the overlapped area OA based on a degree of overlap of the element areas EA.

For example, the initial value of the brightness of the determination image G2 may be set to $2^{n-1}$ (white) instead of 0 (black) as in FIG. 5. In this case, the overlapped area specifying unit 103 may reduce brightness in an element area EA. For example, a portion where the element areas EA are overlapped several times in the determination image G2 has low brightness and appears blackish. For example, the overlapped area specifying unit 103 specifies an area in the determination image G2 where brightness of pixels is less than the threshold value as an overlapped area OA. For example, the overlapped area specifying unit 103 specifies a black pixel area in the binarized determination image G2 as an overlapped area OA.

For example, brightness may be changed not inside the element areas EA but outside the element areas EA. For example, in a case where the initial value of brightness of the determination image G2 is 0 (black) as in FIG. 5, the overlapped area specifying unit 103 may increase the brightness outside the element area EA. In this case, a portion where the element areas EA are overlapped several times in the determination image G2 has low brightness and appears blackish. As such, the overlapped area specifying unit 103 specifies an area in the determination image G2 where brightness of pixels is less than the threshold value as an overlapped area OA. For example, the overlapped area specifying unit 103 specifies a black pixel area in the binarized determination image G2 as an overlapped area OA.

For example, in a case where the initial value of brightness of the determination image G2 is $2^{n-1}$ (white), the overlapped area specifying unit 103 may reduce the brightness outside the element area EA. In this case, a portion where the element areas EA are overlapped several times in the determination image G2 has high brightness and appears whitish. As such, the overlapped area specifying unit 103 specifies an area in the determination image G2 where brightness of pixels is greater than or equal to the threshold value as an overlapped area OA. For example, the overlapped area specifying unit 103 specifies a white pixel area in the binarized determination image G2 as an overlapped area OA.

For example, the case has been described in which the determination image G2 is a gray scale image, although the determination image G2 may be a color image. In this case, as the brightness, one of red, green, and blue brightness may be used, or two or three of red, green, and blue brightness may be used.

For example, the processing shown in FIG. 9 may be executed each time an original image G1 is uploaded, or when a user of the image processing device 10 performs a predetermined operation. Alternatively, the processing may be executed when the time determined by a batch file arrives. For example, the image processing device 10 may be a device of an administrator of an on-line shopping mall, a flea market application, or an Internet auction, or may be a device of a seller. In a case where the image processing device 10 is a device of a seller, the seller extracts the foreground area FA and obtains the search information, and uploads the search information together with the original image G1. Further, the image processing device 10 may be a device of a third party other than the administrator or the seller.

For example, the foreground area extracting unit 104 may simply extract an overlapped area OA as a foreground area FA, instead of executing the separating processing on the overlapped area OA. For example, in order to specify an overlapped area OA, a value that does not particularly relate to brightness may be used instead of using brightness of each pixel. For example, the overlapped area specifying unit 103 may vote pixels in the element areas EA, and specify the pixels having the predetermined number or more of votes as an overlapped area OA. In this case, the number of votes of a pixel corresponds to a value indicating the degree of overlap. Further, such a value may not be prepared for each pixel, but a single value may be prepared for a plurality of pixels to simplify the processing of specifying the overlapped area OA.

For example, a commodity has been taken as an example of the object, although the object may not have to be a commodity, but may be anything that can be a foreground. For example, the object may be a person, an animal, a plant, or a building. As another example, the object may be a vehicle such as a car and a bicycle. For example, the object may be a 3D model or a 2D model in a virtual space. In this case, the 3D model or the 2D model may be a virtual character, or graphics such as clothing, a building, and a vehicle drawn by graphic software.

For example, in a case where something other than a commodity corresponds to the object, the search information may not be obtained from the foreground area FA. The image processing device may perform the predetermined processing based on the foreground area FA extracted by the foreground area extracting unit 104. For example, the image processing device 10 may store the original image G1 and the foreground area FA in association with each other in the data storage unit 100. The foreground area FA may be used for various purposes, such as for being displayed on the display unit 15, or for learning basic shapes of objects. As another example, the foreground area FA may be used for classifying attribute information of the original image G1. That is, the foreground area FA may be used for classifying what are captured in the original image G1.

For example, the functions of the image processing device 10 may be omitted except the image obtaining unit 101, the element area setting unit 102, the overlapped area specifying unit 103, and the foreground area extracting unit 104. For example, the data storage unit 100 may not need to be included in the image processing device 10, but may be implemented by a database server.

The invention claimed is:

1. An image processing device comprising at least one processor configured to:
    obtain an image including a background and an object;
    set, with respect to the image, a plurality of element areas respectively corresponding to a plurality of elements in the image;
    calculate, based on a determination result on whether a pixel is included in an element area, a value indicating a degree of overlap of the element areas in the pixel, the value indicating brightness of a corresponding pixel of a determination image having a same size as the image;
    specify an overlapped area in the image based on a determination result on whether the value is greater than or equal to a threshold value, the overlapped area being an area in which the degree of overlap of the element areas is greater than or equal to a predetermined value, wherein the larger a number of the element areas that are overlapped each other is, the larger the degree is; and
    extract a foreground area from the image based on the overlapped area, the foreground area corresponding to the object.

2. The image processing device according to claim 1, wherein
    the at least one processor executes separating processing on the image to separate the foreground and the background based on the overlapped area, thereby extracting the foreground area.

3. A image processing device comprising the at least one processor configured to:
    obtain an image including a background and an object;
    set, with respect to the image, a plurality of element areas respectively corresponding to a plurality of elements in the image;
    calculate, based on a determination result on whether a pixel is included in an element area, a value indicating a degree of overlap of the element areas in the pixel;
    specify an overlapped area in the image based on a determination result on whether the value is greater than or equal to a threshold value, the overlapped area being an area in which the degree of overlap of the element areas is greater than or equal to a predetermined value, wherein the larger a number of the element areas that are overlapped each other is, the larger the degree is; and
    extract a foreground area from the image based on the overlapped area, the foreground area corresponding to the object,
    wherein the at least one processor:
    sets the threshold value according to the image, and
    determines, for each pixel, whether the value is greater than or equal to the threshold value.

4. The image processing device according to claim 3, wherein the at least one processor:
    specifies a temporary overlapped area based on a determination result on whether the value is greater than or equal to the threshold value for each pixel,
    determines, based on data indicating a basic shape of the object, whether similarity between a shape of the temporary overlapped area and the basic shape is greater than or equal to a predetermined value,
    continues to change the threshold value and determine the similarity until it is determined that the similarity is greater than or equal to the predetermined value, and
    specifies the temporary overlapped area that is determined to be similar to the basic shape as the overlapped area.

5. The image processing device according to claim 3, wherein
    the image is associated with attribute information indicating an attribute of the object, and
    the at least one processor sets the threshold value according to the attribute information of the image.

6. The image processing device according to claim 3, wherein
    the at least one processor sets the threshold value according to a histogram of the image.

7. The image processing device according to claim 1, wherein
    the at least one processor assigns a weight to each of the element areas based on respective positions of the element areas in the image so as to calculate the value.

8. The image processing device according to claim 1, wherein the at least one processor assigns a weight to each element area based on a size of each element area so as to calculate the value.

9. The image processing device according to claim 1, wherein the image is a commodity image showing a commodity to be bought and sold using an Internet, the object is the commodity shown in the commodity image, the at least one processor obtains the commodity image uploaded via the Internet, the foreground area is an area in the commodity image and includes the commodity, and the at least one processor obtains search information of the commodity based on the foreground area extracted from the commodity image.

10. A non-transitory computer-readable information storage medium for storing a program that causes a computer to:

obtain an image including a background and an object;

set, with respect to the image, a plurality of element areas respectively corresponding to a plurality of elements in the image;

calculate, based on a determination result on whether a pixel is included in an element area, a value indicating a degree of overlap of the element areas in the pixel, the value indicating brightness of a corresponding pixel of a determination image having a same size as the image;

specify an overlapped area in the image based on a determination result on whether the value is greater than or equal to a threshold value, the overlapped area being an area in which the degree of overlap of the element areas is greater than or equal to a predetermined value, wherein the larger a number of the element areas that are overlapped each other is, the larger the degree is; and extract a foreground area from the image based on the overlapped area, the foreground area corresponding to the object.

11. The image processing device according to claim 1, wherein the number of the element areas that overlap each other is three or more.

12. A non-transitory computer-readable information storage medium for storing a program that causes a computer to:

obtain an image including a background and an object;

set, with respect to the image, a plurality of element areas respectively corresponding to a plurality of elements in the image;

calculate, based on a determination result on whether a pixel is included in an element area, a value indicating a degree of overlap of the element areas in the pixel;

specify an overlapped area in the image based on a determination result on whether the value is greater than or equal to a threshold value, the overlapped area being an area in which the degree of overlap of the element areas is greater than or equal to a predetermined value, wherein the larger a number of the element areas that are overlapped each other is, the larger the degree is; and extract a foreground area from the image based on the overlapped area, the foreground area corresponding to the object;

wherein the program causes the computer to:

set the threshold value according to the image, and determine, for each pixel, whether the value is greater than or equal to the threshold value.

* * * * *